United States Patent

[11] 3,573,798

[72] Inventor Paul A. Reiling
New Providence, N.J.
[21] Appl. No. 691,475
[22] Filed Dec. 18, 1967
[45] Patented Apr. 6, 1971
[73] Assignee Bell Telephone Laboratories, Inc.
Murray Hill, Berkeley Heights, N.J.

[54] ANALOG-TO-DIGITAL CONVERTER
12 Claims, 5 Drawing Figs.

[52] U.S. Cl. .......... 340/347
[51] Int. Cl. .......... H03k 13/17
[50] Field of Search .......... 340/347

[56] References Cited
UNITED STATES PATENTS

| | | | |
|---|---|---|---|
| 3,098,969 | 7/1963 | Liss et al. .......... | 340/347X |
| 3,274,586 | 9/1966 | Lapinski .......... | 340/347 |
| 3,458,721 | 7/1969 | Maynard .......... | 340/347X |

*Primary Examiner*—Thomas A. Robinson
*Assistant Examiner*—Charles D. Miller
*Attorneys*—R. J. Guenther and Kenneth B. Hamlin

ABSTRACT: A plurality of parallel transistor-resistor combinations are serially connected into two conduction paths extending between a constant current source and ground. When an analog input signal is applied in common to the base terminals of the transistors, a certain number of the resistances connected in parallel therewith are short-circuited, and difference circuit bridged across the conduction paths yields an output representative of a binary digit.

INVENTOR
P. A. REILING
BY D. E. Snedeker
ATTORNEY

ANALOG-TO-DIGITAL CONVERTER

BACKGROUND OF THE INVENTION

This invention relates to data translation arrangements and, more specifically, to arrangements for converting an analog signal into a binary digital code.

In many electrical systems it is desired to represent an analog signal as a series of binary words, that is, as a sequence of ON and OFF pulses. Typically, to accomplish this, the input analog signal is sampled at regular intervals, and each sample is quantized and encoded by an analog-to-digital converter for transmission in the form of a binary word.

Numerous arrangements for analog-to-digital conversion are disclosed in the prior art. One group of known converters, appropriately termed "digit-at-a-time" encoders, rely on repeated comparisons of the analog input signal with predetermined voltage levels to generate successive digits of a representative binary word. Besides being structurally complex, "digit-at-a-time" encoders are hampered by limited speed, since only one binary digit can be generated at a time.

Another class of prior art converters, generally known as electron beam tube encoders, can be constructed to generate all the digits of a representative binary word simultaneously. While thus overcoming the speed limitations of the "digit-at-a-time" converters, tube encoders are large and fragile, and require precision manufacture and adjustment. Furthermore, a high-level wide band linear amplifier is required to drive the deflection circuits of the cathode ray tube.

SUMMARY OF THE INVENTION

It is, accordingly, an object of this invention to provide an improved, high-speed analog-to-digital converter.

It is another object of this invention to provide a sturdy, compact and inexpensive analog-to-digital converter.

It is yet another object of this invention to provide an arrangement for simultaneously generating a plurality of binary digits representative of the amplitude of an analog signal.

It is still another object of this invention to provide an analog-to-digital converter which can be manufactured utilizing integrated circuitry.

In an analog-to-digital converter in accordance with this invention, a plurality of transistors are respectively connected in parallel with individual resistances of like magnitude. The transistor-resistor combinations are serially connected to form two ladder arrangements, and a voltage source is connected to one end of each individual ladder. Serially interconnected in each ladder arrangement with the parallel transistor-resistor combinations thereof are additional resistances of such magnitude that the emitter leads of the transistors are biased at predetermined threshold levels. Identical large resistances are also connected in the ladder arrangements between the transistor-resistor combinations and the voltage source to provide a constant current. A difference circuit connects the points, in each ladder arrangement, between the large resistor and the transistor-resistor combinations. Also, an analog signal input lead is connected in common to the bases of the transistors. The total resistance included serially in each ladder arrangement is such that when there is no input signal, the difference circuit delivers a zero voltage output.

Advantageously, therefore, the structure of an analog-to-digital converter according to this invention is relatively simple and compact. In addition, being composed entirely of solid-state components and resistors, it can be fabricated easily via known integrated circuit techniques.

As the magnitude of the analog input signal applied in common to the base of each transistor is increased, successive ones of the transistors in alternate ladder arrangements become conducting, and the respective shunt resistors are in effect short-circuited. Thus, as the input signal is increased, the output of the difference circuit changes back and forth between a first output level, signifying a binary 0 digit, and a second output level, signifying a binary 1 digit. This process is wholly reversible since identical transitions occur as the input voltage is decreased from a positive value toward zero.

Because the above-described arrangement, in effect, decides which one of a plurality of predetermined voltage intervals corresponds to the magnitude of the analog input signal, it can appropriately be termed a "decision circuit." In one embodiment, in accordance with this invention, a plurality of such decision circuits are connected in common to the analog input signal. The transistors contained within each circuit are biased in such fashion that a particular multibit binary word appears as the output of the difference circuits for each level of input signal applied to the system.

BRIEF DESCRIPTION OF THE DRAWING

The invention may be more readily understood by reference to the following detailed description thereof taken in conjunction with the accompanying drawing in which.

DETAILED DESCRIPTION

Figure 1:
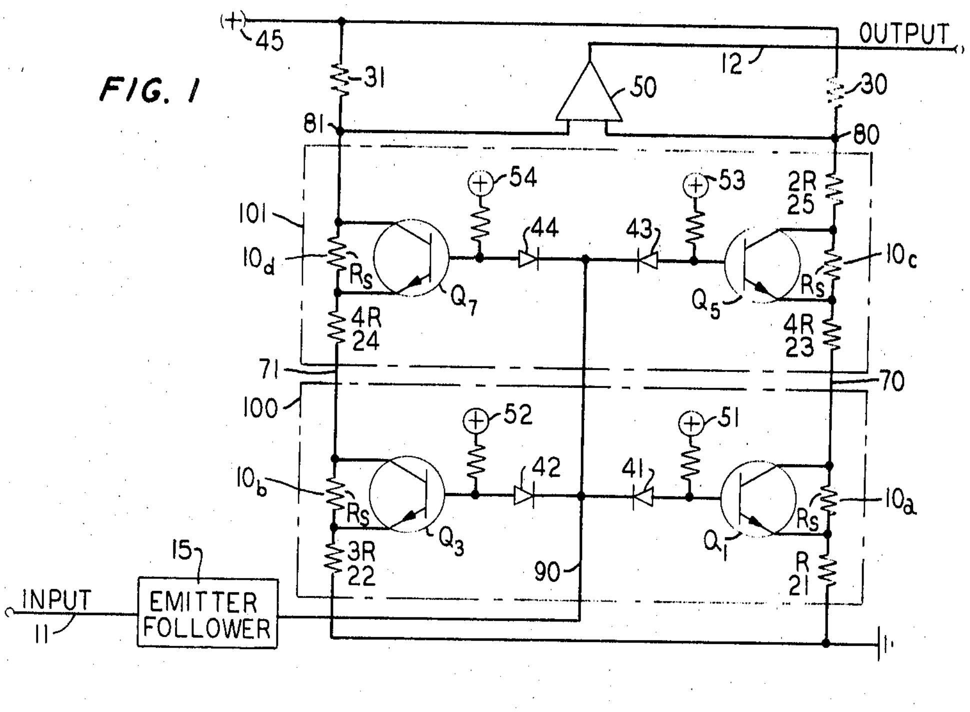
FIG. 1 is a schematic diagram of an illustrative embodiment of a decision circuit for generating a single binary digit in accordance with the invention.

FIG. 1 shows a decision circuit for producing a single binary digit in accordance with the principles of the invention. Transistors $Q_1$, $Q_3$, $Q_5$, and $Q_7$ thereof are each connected respectively in parallel with resistors $10_a$, $10_b$, $10_c$, and $10_d$, each of like magnitude $R_s$, through the collector and emitter leads. Two of the parallel transistor-resistor combinations, namely those including transistors $Q_1$ and $Q_5$ and resistors $10_a$ and $10_c$, are serially included in conduction path 70, which is connected at one end through resistor 30 to source 45 and at the other end to the ground. The other two transistor-resistor combinations, including transistors $Q_3$ and $Q_7$ and resistors $10_b$ and $10_d$, are serially included in conduction path 71, which is connected at one end through resistor 31 to source 45 and at the other end to ground. Resistors 30 and 31 are substantially equal and of such magnitude that the currents supplied by source 45 to paths 70 and 71 are constant.

Serially included in conduction paths 70 and 71 are additional resistors 21, 22, 23, and 24 and balancing resistor 25, having relative magnitudes of R, 3R, 4R, 4R, and 2R, respectively. Resistors 21 and 22 are connected between transistors $Q_1$ and $Q_3$, respectively, and ground. Resistors 23 and 24 are respectively included in conduction paths 70 and 71 between transistors $Q_5$ and $Q_1$ and transistors $Q_7$ and $Q_3$. Balancing resistor 25 is connected in conduction path 70 between resistor 30 and transistor $Q_5$ in order to equalize the total resistance included in path 70 with that included in path 71.

The analog input signal to be encoded is applied on input lead 11 and directed through emitter follower 15 to common base lead 90. Common base lead 90 is connected to the bases of transistors $Q_1$, $Q_3$, $Q_5$, and $Q_7$ through diodes 41, 42, 43, and 44, respectively, which are poled toward emitter follower 15. Also connected to the bases of transistors $Q_1$, $Q_3$, $Q_5$, and $Q_7$ are sources 51, 52, 53, and 54, respectively.

The digital output is provided by difference circuit 50 on output lead 12. Difference circuit 50 is connected between points 80 and 81 of conduction paths 70 and 71, respectively.

Consider now the operation of the arrangement of FIG. 1. When no analog input signal is applied on lead 11, diodes 41 through 44 are forward-biased by respective sources 51 through 54, and each of transistors $Q_1$, $Q_3$, $Q_5$, and $Q_7$ is nonconducting. As a result, the current in conduction path 70 flows from source 45 through each of serially connected resistors 30, 25, $10_c$, 23, $10_a$, and 21 to ground. Similarly, the current in conduction path 71 flows from source 45 through each of resistors 31, $10_d$, 24, $10_b$, and 22 to ground. The output of difference circuit 50 on lead 12 is zero, corresponding to a binary 0 digit output, since resistors 30 and 31 are of equal magnitude and the resistance serially connected in conduction path 70 between point 80 and ground is identical to the total resistance serially connected in conduction path 71 between point 81 and ground.

The bias voltages of the respective emitters of transistors $Q_1$, $Q_3$, $Q_5$, and $Q_7$ are each determined principally by the magnitudes of the various additional resistors 21 through 24 connected in conduction paths 70 and 71. The bias voltage at the emitter of transistor $Q_1$, for example, is the product of the magnitude of the current in path 70 and the magnitude R of resistor 21. The bias voltage at the emitter of transistor $Q_5$ is similarly related to the combined magnitude of serially connected resistors 21 and 23, provided that resistor $10_a$ is effectively short-circuited by transistor $Q_1$. If the shunt resistor $10_b$ is short-circuited through transistor $Q_3$, a similar relationship holds for conduction path 71. The emitter voltage of transistor $Q_3$ is the product of the current in conduction path 71 and the magnitude 3R of resistor 22. The emitter bias voltage of transistor $Q_7$ depends upon the combined magnitudes of serially connected resistors 22 and 24.

As the magnitude of the analog input signal increases from zero, the voltage on base lead 90 increases toward the emitter bias voltage of transistor $Q_1$. When this value is reached, transistor $Q_1$ becomes conducting, and resistor $10_a$ is in effect short-circuited. With resistor $10_a$ effectively removed from conduction path 70, the voltage at point 80 in path 70 falls with respect to the voltage at point 81 in path 71, and the output of difference circuit 50 assumes a nonzero value, corresponding to a binary 1 digit output.

If the analog input signal decreases to the point where the voltage on lead 90 is again lower than the emitter bias voltage of transistor $Q_1$, transistor $Q_1$, becomes nonconducting, and the output of difference circuit 50 on lead 12 returns to zero.

If, on the other hand, the magnitude of the analog input signal increases, driving the voltage on lead 90 to a value equal to the emitter bias voltage of transistor $Q_3$, transistor $Q_3$ becomes conducting and short-circuits resistor $10_b$. As a result, the voltage of point 81 decreases and again becomes the same as the voltage of point 80, and the output of difference circuit 50 returns to a zero value, corresponding to a binary 0 digit output.

If the input voltage on lead 90 increases still further to the emitter voltage of transistor $Q_5$, transistor $Q_5$ is rendered conducting, thereby effectively removing resistor $10_c$ from conduction path 70. The output of difference circuit 50 then corresponds to a binary 1 digit output. Similarly, when the voltage on lead 90 reaches the emitter voltage of transistor $Q_7$, resistor $10_d$ is short-circuited, and the output on lead 12 corresponds again to a binary 0 digit.

Figure 2:
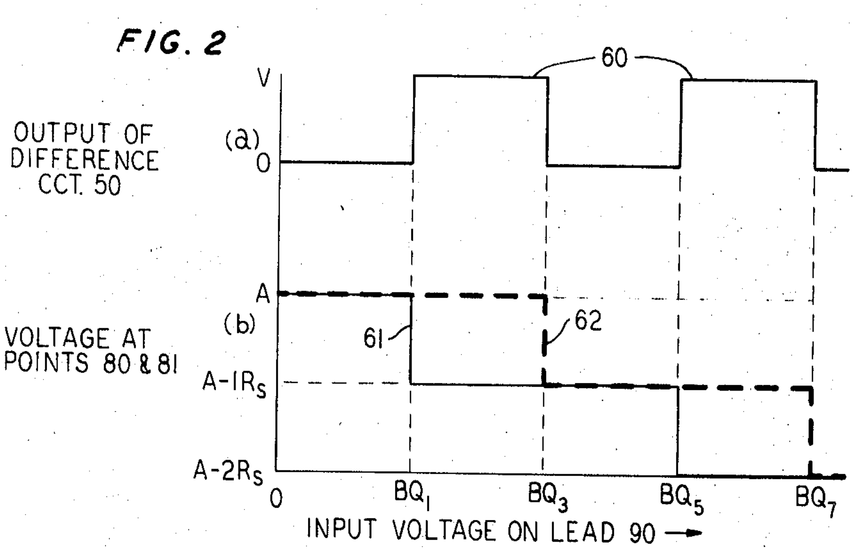
FIG. 2 shows several waveforms useful in describing the operation of the circuit in FIG. 1.

FIG. 2 shows several waveforms useful in describing the operation of the decision circuit discussed above. The waveform 60 depicted in FIG. 2(*a*) represents the output of difference circuit 50 on lead 12 as a function of the input voltage on lead 90. Waveforms 61 and 62 in FIG. 2(*b*) represent the voltages at points 80 and 81, respectively, as the input voltage on lead 90 increases linearly. As is apparent from the structure of the decision circuit shown in FIG. 1, waveform 60 represents the difference between waveforms 61 and 62.

For a zero voltage input, the output of difference circuit 50 is zero, and the voltage at each of points 80 and 81 is at a level arbitrarily called A in FIG. 2(*b*). When the voltage on lead 90 is increased to the level of the emitter bias potential of transistor $Q_1$, shown as $BQ_1$ in FIG. 2, the voltage at point 80 falls by an amount equal to $IR_5$, $R_s$ being, as discussed above, the magnitude of resistor $10_a$, and I being the constant current supplied to each of conductive paths 70 and 71 by source 45. Coincidentally, the output of difference circuit 50 increases to output level V shown in FIG. 2(*a*), reflecting the difference in potential between points 80 and 81, output level V representing a binary 1 output on lead 12.

When the voltage on lead 90 reaches the emitter bias potential $BQ_3$ of transistor $Q_3$, the voltage at point 81 falls by an amount equal to $IR_s$, as indicated by waveform 62 in FIG. 2(*b*). The potentials at points 80 and 81 are again equal and the output of difference circuit 50 returns to zero. Similarly, when the voltage on lead 90 successively exceeds the emitter bias voltages $BQ_5$ and $BQ_7$ of transistors $Q_5$ and $Q_7$, the voltages at points 80 and 81 successively fall by a further amount $IR_s$, as depicted in FIG. 2(*b*), and the output of difference circuit 50 rises to output level V and then falls to a zero level.

The above discussion indicates that conduction paths 70 and 71 can be viewed as potential divider paths, with points 80 and 81, respectively, as the dividing points. The combined resistance in each of paths 70 and 71 between respective points 80 and 81 and ground varies inversely with the quantized value of the analog input signal on line 11. As a result, the output of difference circuit 50, which bridges points 80 and 81 of the potential divider paths, is responsive to the quantized value of the input signal. Threshold voltage levels in the relative ratios of 1, 3, 5, and 7 are recognized, and a binary 0 or binary 1 is read out, depending on the interval of relative magnitudes within which the input voltage lies. Referring again to FIG. 1, the relative threshold levels 1 and 3 are so recognized in converter stage 100 comprising transistors $Q_1$ and $Q_3$, and levels 5 and 7 are recognized in converter stage 101 comprising transistors $Q_5$ and $Q_7$.

Alternatively, the combined resistance in paths 70 and 71 between respective points 80 and 81 and ground can be viewed as individual "variable resistances," the magnitudes of which are alternately varied in accordance with the quantized magnitude of the input signal on line 11. The remaining circuitry shown in FIG. 1, including points 80 and 81, difference circuit 50, resistors 30 and 31, and source 45, then functions to detect the relative magnitudes of the "variable resistances" included in paths 70 and 71 and generate a binary output representative thereof.

Figure 3:
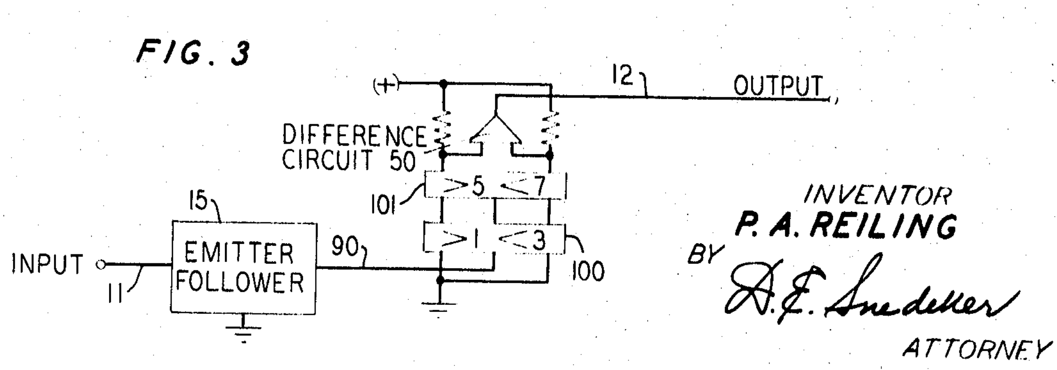
FIG. 3 is a symbolic block diagram of the decision circuit of FIG. 1.

FIG. 3 shows a symbolic block diagram of the decision circuit depicted in FIG. 1. The emitter follower 15 and difference circuit 50 correspond to the similarly designated components in FIG. 1. Blocks 100 and 101 correspond to the similarly numbered converter stages in FIG. 1. The intervals specified in blocks 100 and 101 indicate the ranges of ranges of relative values of input voltage for which a binary 1 digit is generated; that is, a binary 1 is generated on lead 12 when the analog input signal on lead 11 is between the relative values 1 and 3 and when it is between the relative values 5 and 7. At all other values of input voltage a binary 0 digit appears on output lead 12.

It is evident that the number of input voltage intervals recognizable by a converter circuit in accordance with this invention can be increased advantageously by interconnecting additional transistor-resistor combinations into each ladder arrangement. Furthermore, the relative voltage interval ranges recognized can be changed readily by varying the relative magnitudes of the additional resistors included serially between adjacent parallel transistor-resistor combinations. For example, if additional resistors 21 through 24 and balancing resistors 25 in FIG. 1 are altered in such a way that they have relative values of 1, 2, 2, 2, and 1, respectively, threshold voltage magnitudes in the ratio of 1, 2, 3, and 4 would be recognized, and a binary 1 would appear on output lead 12 when the input signal is between relative values 1 and 2 and when it is between relative values 3 and 4.

Figure 4:
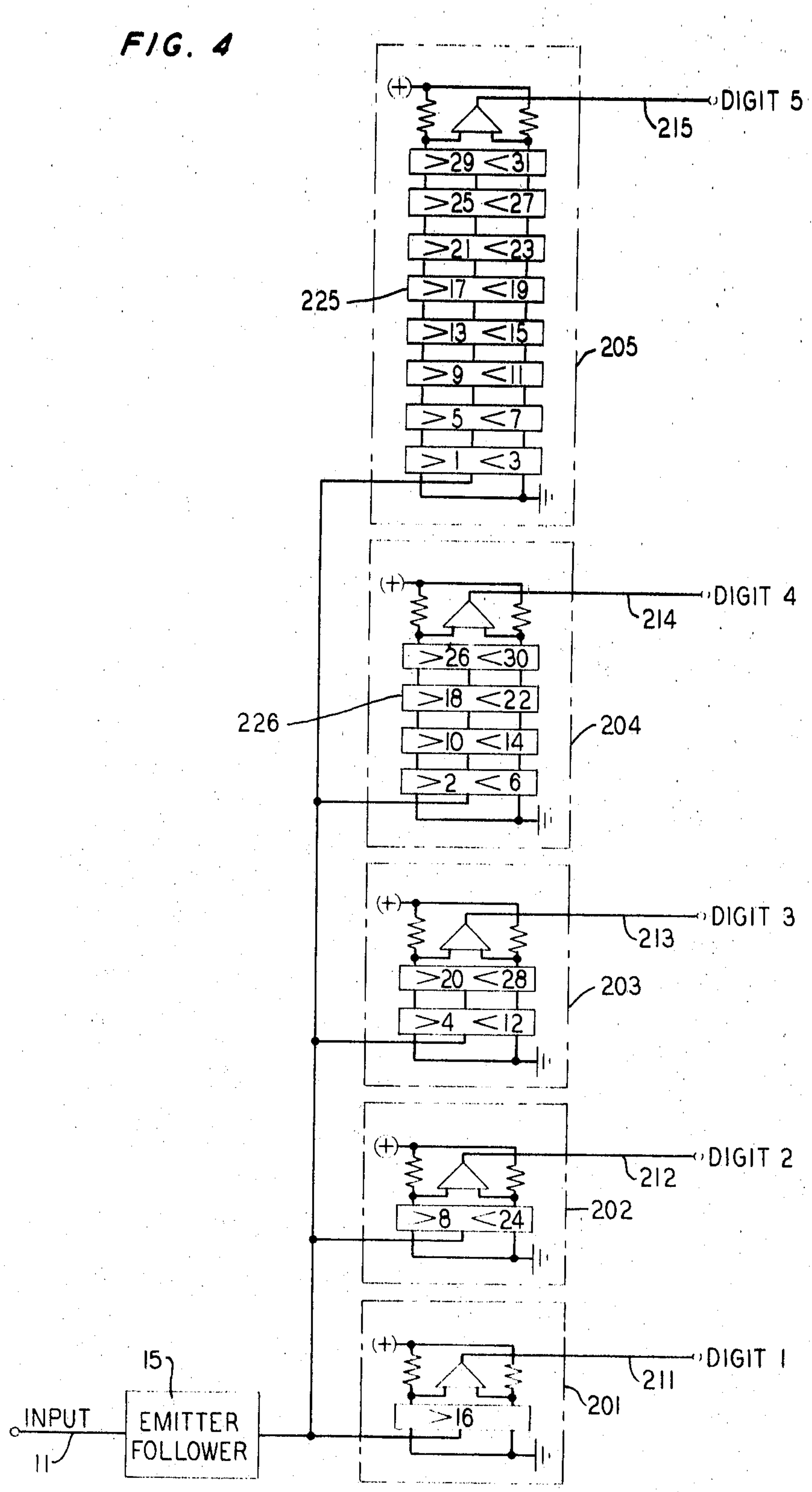
FIG. 4 is a block diagram of an illustrative embodiment of a multibit analog-to-digital converter in accordance with the principles of the invention for producing a Gray code output.

FIG. 4 is a block diagram representation of a multibit analog-to-digital converter in accordance with the principles of the invention for generating, by way of example, a 5-digit Gray or reflected binary code simultaneously on parallel output leads 211 through 215. Decision circuits 201 through 205 for producing binary digits are similar to the arrangement described in connection with FIGS. 1 and 3. Each rectangular block in decision circuits 201 through 205 represents an individual converter stage for generating a binary 1 output when the analog input signal falls between the relative voltage magnitudes indicated within the block. "Digit 5" output on lead 215 is the least significant digit and "digit 1" on lead 211 is the most significant digit of the code generated by the converter in FIG. 4.

To illustrate the operation of the system shown in FIG. 4, assume that the analog input signal on lead 11 is at a relative magnitude of 18.5. At this level, decision circuit 205 associated with "digit 5" will deliver an output on lead 215 representative of a binary 1, since the input magnitude lies between relative values 17 and 19 recognized by converter stage 225 in decision circuit 205. Similarly, the outputs at digits 1 through 4 on leads 201 through 204 will be representative of binary 1, 1, 0, and 1, respectively. Accordingly the output of the converter in FIG. 4 is the Gray code binary word 11011, equivalent to the decimal number 18.

It is apparent, moreover, that the binary word 11011 is generated as an output for any magnitude of relative input signal within the interval 18 to 19. If the analog input signal increases to 19.5, "digit 5" changes from a binary 1 to a binary 0, while all other digits remain the same. The Gray code word 11010, equivalent to decimal number 19, is thus generated. If the analog input signal decreases to 17.5, "digit 5" remains a binary 1, while "digit 4" on lead 214, governed by converter stage 226 in decision circuit 204, changes from binary 1 to binary 0. The resultant multibit Gray code output is thus 11001, representative of the decimal number 17.

Similarly, for all levels of the relative input signal magnitude up to 32, the system shown in FIG. 4 generates a Gray code word representative of the next lower integral value.

As the number of output digits desired increases, the cost of producing analog-to-digital converters in accordance with the illustrative embodiment of FIG. 4 becomes prohibitive. The cost of manufacture is reduced advantageously, however, in accordance with a further aspect of the invention, if identical mass-produced circuitry is used for each of the decision circuits employed in constructing a multibit converter. In addition, integrated circuits can be used readily in fabricating such a system.

Figure 5:
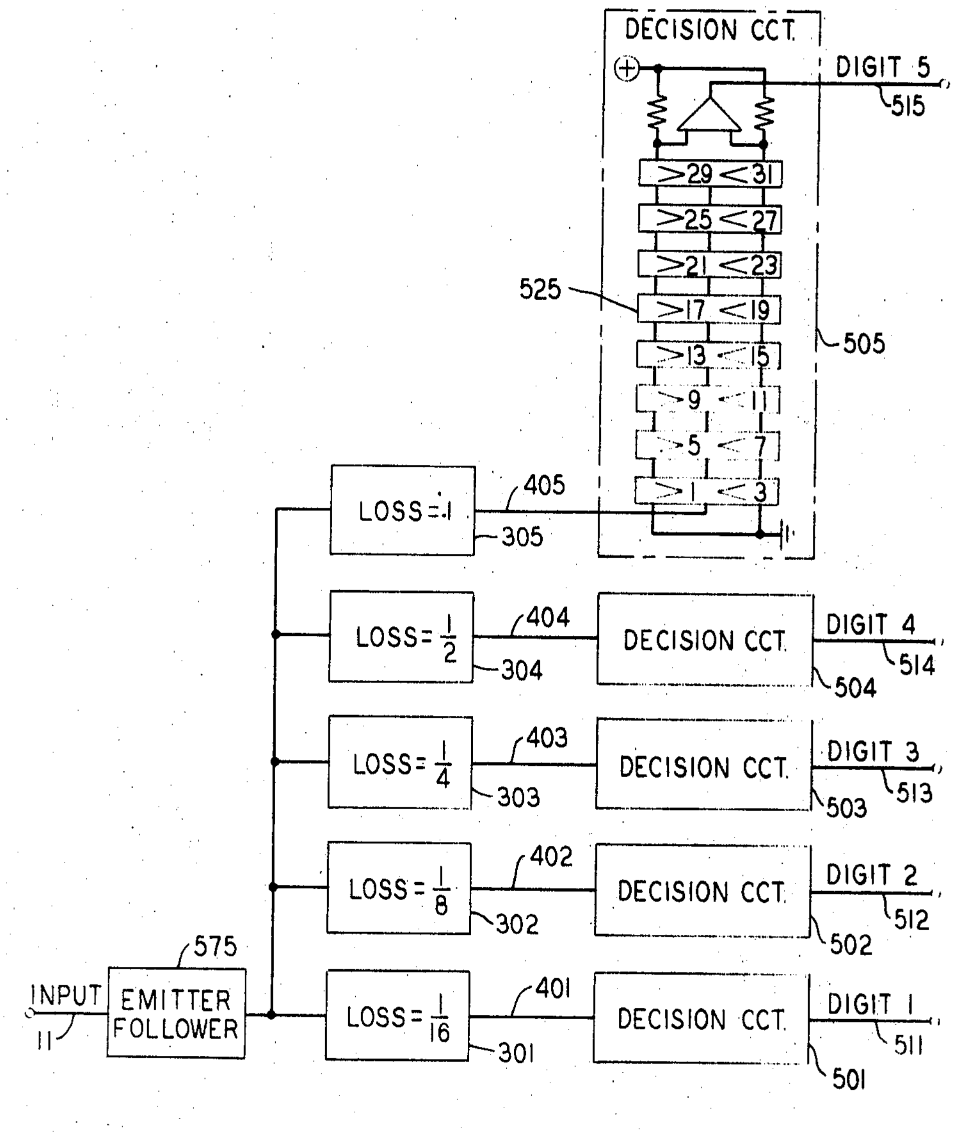
FIG. 5 is a block diagram of another illustrative embodiment of a multibit converter in accordance with the principles of the invention.

FIG. 5 is a block diagram for an illustrative Gray code converter embodiment employing identical decision circuits for each binary output digit. Decision circuits 501 through 505, which generate binary digits 1 through 5, respectively, are each identical to decision circuit 205 in FIG. 4. In the conduction path between individual decision circuits 501 through 505 and emitter follower 575 are respectively included signal magnitude variation circuits 301 through 305, having respective insertion loss magnitudes of one-sixteenth, one-eighth, one-fourth, one-half and one. Lines 401 through 405 connect signal magnitude variation circuits 301 through 305 to decision circuits 501 through 505, respectively.

The operation of this converter embodiment is similar to that of the converter embodiment of FIG. 4. Suppose that the relative magnitude of the input analog signal on lead 11 is 18.5 In the manner described above in connection with FIG. 4, decision circuit 505 generates a binary 1 on lead 515, the input signal lying within the range recognized by converter stage 525. The relative signal magnitudes on lines 401 through 404, as a result of the losses inserted by signal magnitude variation circuits 301 through 304, are 18.5/16, 18.5/8, 18.5/4 and 18.5/2, or 1.16, 2.33, 4.62, and 9.25, respectively. Accordingly, recalling that decision circuits 501 through 504 are identical to decision circuit 505, it is readily appreciated that decision circuit 504 is responsive to the input signal to generate a binary 1 on lead 514 and decision circuits 501 through 503 are each responsive to the input signal to generate binary 1, 1 and 0, respectively, on leads 511 through 513. The binary Gray code output of the system is thus 11011, or decimal number 18. It is apparent that if the relative input signal magnitude is increased to 19.5 the Gray code word 11010, equivalent to decimal number 19, appears on output leads 511 through 515. As with the converter shown in FIG. 4, this embodiment generates the Gray code word representative of the integral value next below the relative analog input signal magnitude.

It will be apparent from this discussion that basic decision circuitry of the type depicted in FIG. 1 can be arranged in other configurations to produce various binary codes having any number of digits. Accordingly, it is to be understood that the above-described arrangements are merely illustrative of the application of the principles of the invention. Numerous other arrangements may be devised by those skilled in the art without departing from the spirit and scope of the invention.

I claim:

1. In an analog-to-digital converter, a first converter stage comprising:
first and second conduction paths;
first and second impedance means serially included respectively in said first and second conduction paths;
first switching means connected in parallel with said first impedance means and having a first input voltage terminal;
said first switching means shunting said first impedance means when the voltage at said first input voltage terminal reaches a first predetermined level,
a first potential level connected to one end of said second conduction path and through a first resistance to one end of said first conduction path;
output means connected to said one end of each of said first and second conduction paths; and
a second potential level connected to the opposite end of each of said first and second conduction paths.

2. In an analog-to-digital converter in accordance with claim 1;
second switching means connected in parallel with said second impedance means and having a second input voltage terminal;
said second switching means shunting said second impedance means when the voltage at said second input voltage terminal reaches a second predetermined level, and
a second resistance serially included between said first potential level and said one end of said second conduction path.

3. In an analog-to-digital converter in accordance with claim 2, a second converter stage comprising:
third and fourth conduction paths;
third and fourth impedance means serially included respectively in said third and fourth conduction paths;
third switching means connected in parallel with said third impedance means and having a third input voltage terminal;
said third switching means shunting said third impedance means when the voltage at said third input voltage terminal reaches a third predetermined level,
fourth switching means connected in parallel with said fourth impedance means and having a fourth input voltage terminal;
said fourth switching means shunting said fourth impedance means when the voltage at said fourth input voltage terminal reaches a fourth predetermined level; and
said third and fourth conduction paths being serially connected respectively between said first and second paths and said second potential level.

4. In an analog-to-digital converter in accordance with claim 3, a common analog input signal terminal connected to said first, second, third and fourth input voltage terminals.

5. An analog-to-digital converter in accordance with claim 4 wherein said output means comprises differencing means.

6. An analog-to-digital converter in accordance with claim 5 wherein said first, second, third and fourth switching means comprise respectively a first, a second, a third and a fourth transistor whose individual collector and emitter electrodes are connected respectively in parallel with said first, second, third and fourth impedance means; and wherein said first, second, third and fourth input voltage terminals are individually connected to the respective base electrodes of said first, second, third and fourth transistors.

7. An analog-to-digital converter in accordance with claim 6 further comprising first, second, third, and fourth resistances serially included in said first, second, third, and fourth conduction paths for respectively establishing said first, second, third, and fourth predetermined levels.

8. An analog-to-digital converter in accordance with claim 7 comprising a balancing resistor serially connected in one of said first, second, third and fourth conduction paths.

9. An analog-to-digital converter comprising two voltage-divider conduction paths connected in parallel between first and second potential levels, each said conduction path including serially connected therein variable resistance means including a signal input terminal, the resistance of said variable resistance means being inversely proportional to the quantized magnitude of a signal appearing at said input terminal; an analog signal input path connected in common to said signal input terminal in each of said voltage-divider paths; and digital output means including means connected to each of said voltage-divider paths for determining the difference in resistance between said variable resistance means in said voltage-divider paths.

10. In a multidigit analog-to-digital converter; a plurality of single digit converters individually comprising first and second conduction paths, a common analog signal input terminal, first and second variable resistance means respectively included in said first and second conduction paths and connected to said common input terminal, the respective magnitudes of said first and second variable resistance means being alternately varied in accordance with the quantized magnitude of the analog signal at said common input terminal, and digital output means including detection means connected to said first and second conduction paths for detecting the difference in magnitude between said first and second variable resistance means.

11. In a multidigit analog-to-digital converter in accordance with claim 10 wherein said plurality of single digit converters are substantially identical to one another, a plurality of input paths respectively associated with said plurality of single digit converters, each said input path being individually connected to said common input terminal of said associated converter, and individual signal magnitude variation means respectively included in each of said input paths.

12. A multidigit analog-to-digital converter comprising:

a plurality of identical decision circuits;

said decision circuits each comprising an individual signal input terminal and means for generating alternately a first and a second output signal as the magnitude of the signal at said individual signal input terminal successively exceeds a plurality of predetermined levels;

a common analog signal input terminal; and a plurality of individual signal magnitude variation means respectively connecting each of said individual signal input terminals to said common analog signal input terminal.

UNITED STATES PATENT OFFICE

CERTIFICATE OF CORRECTION

Patent No. 3,573,798 Dated April 6, 1971

Inventor(s) Paul A. Reiling

It is certified that error appears in the above-identified patent and that said Letters Patent are hereby corrected as shown below:

Delete the whole of Claim 12.

On the cover sheet [54] "12 Claims." should read -- 11 Claims. --.

Signed and sealed this 3rd day of August 1971.

(SEAL)
Attest:

EDWARD M.FLETCHER,JR.
Attesting Officer

WILLIAM E. SCHUYLER, JR
Commissioner of Patents